US009613616B2

(12) United States Patent
de Freitas et al.

(10) Patent No.: US 9,613,616 B2
(45) Date of Patent: *Apr. 4, 2017

(54) SYNTHESIZING AN AGGREGATE VOICE

(71) Applicant: International Business Machines Corporation, Armonk, NY (US)

(72) Inventors: Jose A. G. de Freitas, Eastleigh (GB); Guy P. Hindle, Romsey (GB); James S. Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,599

(22) Filed: May 31, 2016

(65) Prior Publication Data

US 2016/0275935 A1 Sep. 22, 2016

Related U.S. Application Data

(63) Continuation of application No. 14/501,230, filed on Sep. 30, 2014, now Pat. No. 9,384,728.

(51) Int. Cl.

| | |
|---|---|
| ***G10L 13/08*** | (2013.01) |
| ***G10L 13/00*** | (2006.01) |
| ***G10L 15/00*** | (2013.01) |
| ***G10L 15/26*** | (2006.01) |
| ***G10L 13/033*** | (2013.01) |
| ***G10L 13/027*** | (2013.01) |
| ***G10L 13/10*** | (2013.01) |
| ***G10L 13/04*** | (2013.01) |

(52) U.S. Cl.
CPC .......... *G10L 13/033* (2013.01); *G10L 13/027* (2013.01); *G10L 13/043* (2013.01); *G10L 13/10* (2013.01)

(58) Field of Classification Search
None
See application file for complete search history.

(56) References Cited

U.S. PATENT DOCUMENTS

| | | | |
|---|---|---|---|
| 6,081,780 | A | 6/2000 | Lumelsky |
| 6,871,178 | B2 | 3/2005 | Case et al. |
| 6,961,895 | B1 | 11/2005 | Beran et al. |
| 7,277,855 | B1 | 10/2007 | Acker et al. |
| 7,475,016 | B2 | 1/2009 | Smith |
| 7,483,832 | B2 | 1/2009 | Tischer |
| 7,853,659 | B2 | 12/2010 | Cowen et al. |

(Continued)

OTHER PUBLICATIONS

Anonymous, "Service for Session-Level Voice Normalization", IP.com Prior Art Database Technical Disclosure, Nov. 10, 2011. IP.com No. IPCOM000212411D. 5 pages.

(Continued)

*Primary Examiner* — Satwant Singh
(74) *Attorney, Agent, or Firm* — Stosch Sabo

(57) ABSTRACT

A system and computer-implemented method for synthesizing multi-person speech into an aggregate voice is disclosed. The method may include crowd-sourcing a data message configured to include a textual passage. The method may include collecting, from a plurality of speakers, a set of vocal data for the textual passage. Additionally, the method may also include mapping a source voice profile to a subset of the set of vocal data to synthesize the aggregate voice.

15 Claims, 5 Drawing Sheets

(56) References Cited

U.S. PATENT DOCUMENTS

| | | | | |
|---|---|---|---|---|
| 7,899,672 | B2 | 3/2011 | Qin et al. | |
| 8,355,919 | B2 | 1/2013 | Silverman et al. | |
| 8,380,508 | B2 * | 2/2013 | Plumpe | G10L 13/033 704/260 |
| 8,655,659 | B2 | 2/2014 | Wang et al. | |
| 8,694,319 | B2 * | 4/2014 | Bodin | G10L 13/033 704/235 |
| 9,117,451 | B2 * | 8/2015 | Fructuoso | G10L 13/04 |
| 2009/0024393 | A1 | 1/2009 | Kaneyasu | |
| 2011/0282668 | A1 | 11/2011 | Stefan | |
| 2012/0265533 | A1 | 10/2012 | Honeycutt | |
| 2014/0122081 | A1 | 5/2014 | Kaszczuk et al. | |
| 2014/0236598 | A1 | 8/2014 | Fructuoso et al. | |
| 2014/0278433 | A1 * | 9/2014 | Iriyama | G10L 13/02 704/261 |
| 2016/0093286 | A1 | 3/2016 | de Freitas et al. | |

OTHER PUBLICATIONS

IBM, "Scheduled Simultaneous Voice Synthesis depending on significant parts in Text", IP.com Prior Art Database Technical Disclosure. Original Publication Date : Mar. 1, 2001. IP.com No. IPCOM000013009D. IP.com Electronic Publication: Jun. 12, 2003. 3 pages.

Unknown, "Oxford Dictionaries", Oxford University Press, last accessed Sep. 25, 2014. http://www.oxforddictionaries.com/ © 2014 Oxford University Press Last printed Sep. 25, 2014. 12 pages.

List of IBM Patents or Patent Applications Treated as Related, May 26, 2016. 2 pages.

* cited by examiner

SYNTHESIZING AN AGGREGATE VOICE

BACKGROUND

The present disclosure relates to computer systems, and more specifically, to synthesizing an aggregate voice.

There are times when listening to textual content may be easier or more efficient than reading it. Text-to-speech tools can be useful for converting written text into audible sounds and words. As the amount of textual and written content available to users increases, the need for text-to speech tools may also increase.

SUMMARY

Aspects of the present disclosure, in certain embodiments, are directed toward a system and method for synthesizing multi-person speech into an aggregate voice. In certain embodiments, the method may include crowd-sourcing a data message configured to include a textual passage. In certain embodiments, the method may include collecting, from a plurality of speakers, a set of vocal data for the textual passage. In certain embodiments, the method may also include mapping a source voice profile to a subset of the set of vocal data to synthesize the aggregate voice.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
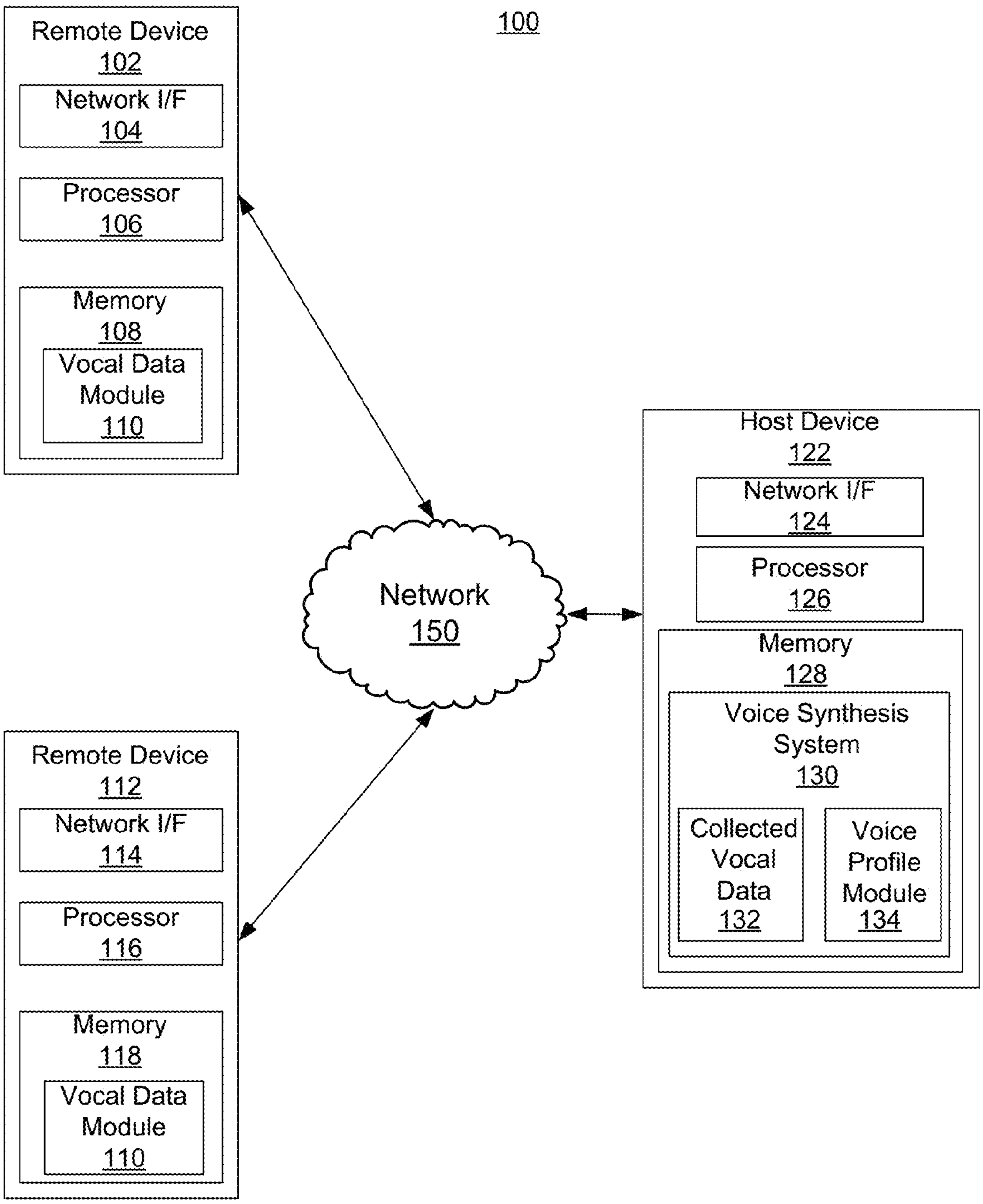
FIG. 1 is a diagrammatic illustration of an exemplary computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for synthesizing multi-person speech into an aggregate voice. More particular aspects relate to using a voice profile and collected vocal data to synthesize the aggregate voice. The method may include crowd-sourcing a data message configured to include a textual passage. The method may also include collecting a set of vocal data from a plurality of speakers for the textual passage. The method may also include mapping a source voice profile to a subset of the set of vocal data to synthesize the aggregate voice.

There are times when listening to textual content may be easier or more efficient than reading it. For example, users who are walking, driving, or engaged in other activities may find it easier to listen to textual content in an audible form instead of reading the words on a screen or page. Text-to-speech tools are one useful way of converting written, textual content into audible sounds and words. However, aspects of the present disclosure, in certain embodiments, relate to the recognition that listening to a computer-synthesized voice, or textual content read by multiple users, may not be completely consistent or natural. Accordingly, aspects of the present disclosure, in certain embodiments, are directed toward collecting voice recordings for a crowd-sourced textual passage, and using a source voice profile to synthesize an aggregate voice. Aspects of the present disclosure may be associated with benefits including natural speech, consistent tone and accent, and performance.

Aspects of the present disclosure relate to various embodiments of a system and method for synthesizing multi-person speech into an aggregate voice. More particular aspects relate to using a voice profile and collected vocal data to synthesize the aggregate voice. The method and system may work on a number of devices and operating systems. Aspects of the present disclosure, in certain embodiments, include crowd-sourcing a data message configured to include a textual passage.

In certain embodiments, the method may include collecting, from a plurality of speakers, a set of vocal data for the textual passage. The vocal data may include a first set of enunciation data corresponding to a first portion of the textual passage, a second set of enunciation data corresponding to a second portion of the textual passage, and a third set of enunciation data corresponding to both the first and second portions of the textual passage. Further, in certain embodiments, the method may include detecting, by an incentive system, a transition phase of an entertainment content sequence. The method may also include presenting, during the transition phase of the entertainment content sequence, a speech sample collection module configured to record enunciation data for the textual passage. In certain embodiments, the method may also include advancing, in response to recording enunciation data for the textual passage, the entertainment content sequence.

In certain embodiments, the method may include mapping a source voice profile to a subset of the set of vocal data to synthesize the aggregate voice. Mapping the source voice profile to a subset of the set of vocal data to synthesize the aggregate voice may include extracting phonological data from the set of vocal data, wherein the phonological data includes pronunciation tags, intonation tags, and syllable rates. The method may include converting, based on the phonological data including pronunciation tags, intonation tags, and syllable rates, the set of vocal data into a set of phoneme strings. Further, the method may also include applying, to the set of phoneme strings, the source voice profile. The source voice profile may include a predetermined set of phonological and prosodic characteristics corresponding to a voice of a first individual. The phonological and prosodic characteristics may include rhythm, stress, tone, and intonation.

Further aspects of the present disclosure are directed toward calculating, using a natural language processing technique configured to analyze the set of vocal data, a spoken word count for the first set of enunciation data. The method may then include computing, based on the spoken word count and a predetermined word quantity, reward credits. The reward credits may, in certain embodiments, be transmitted to a first speaker of the first set of enunciation data. In certain embodiments, the method may further include assigning, based on evaluating the phonological data from the set of vocal data, a first quality score to the first set of enunciation data. The method may then include transmitting, in response to determining that the first quality score is greater than a first quality threshold, bonus credits to the first speaker.

Turning now to the figures, FIG. 1 is a diagrammatic illustration of an exemplary computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a voice synthesis system 130 having collected vocal data 132 and a vocal profile module 134. In certain embodiments, the collected vocal data 132 may be collected from one or more remote devices, such as remote devices 102, 112. In certain embodiments, the voice profile module 134 may be configured to synthesize an aggregate voice, as described herein. The voice profile may utilize one or more source voice profiles. In certain embodiments, the source voice profiles may be stored locally on the host device 122. In certain embodiments, the source voice profiles may be stored on a remote database accessible to the host device 122.

In certain embodiments, remote devices 102, 112 enable users to submit vocal data (e.g., voice recordings, enunciation data) to host devices 122. For example, the remote devices 102, 112 may include a vocal data module 110 (e.g., in the form of a web browser or other suitable software module) and present a graphical user (e.g., GUI, etc.) or other interface (e.g., command line prompts, menu screens, etc.) to collect data (e.g., vocal data) from users for submission to one or more host devices 122.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., determining a user state, extracting characterization information for an object, determining a relationship between the object and the user state, generating a set of inferred questions), and may be implemented by any combination of any quantity of software and/or hardware modules or units.

Figure 2:
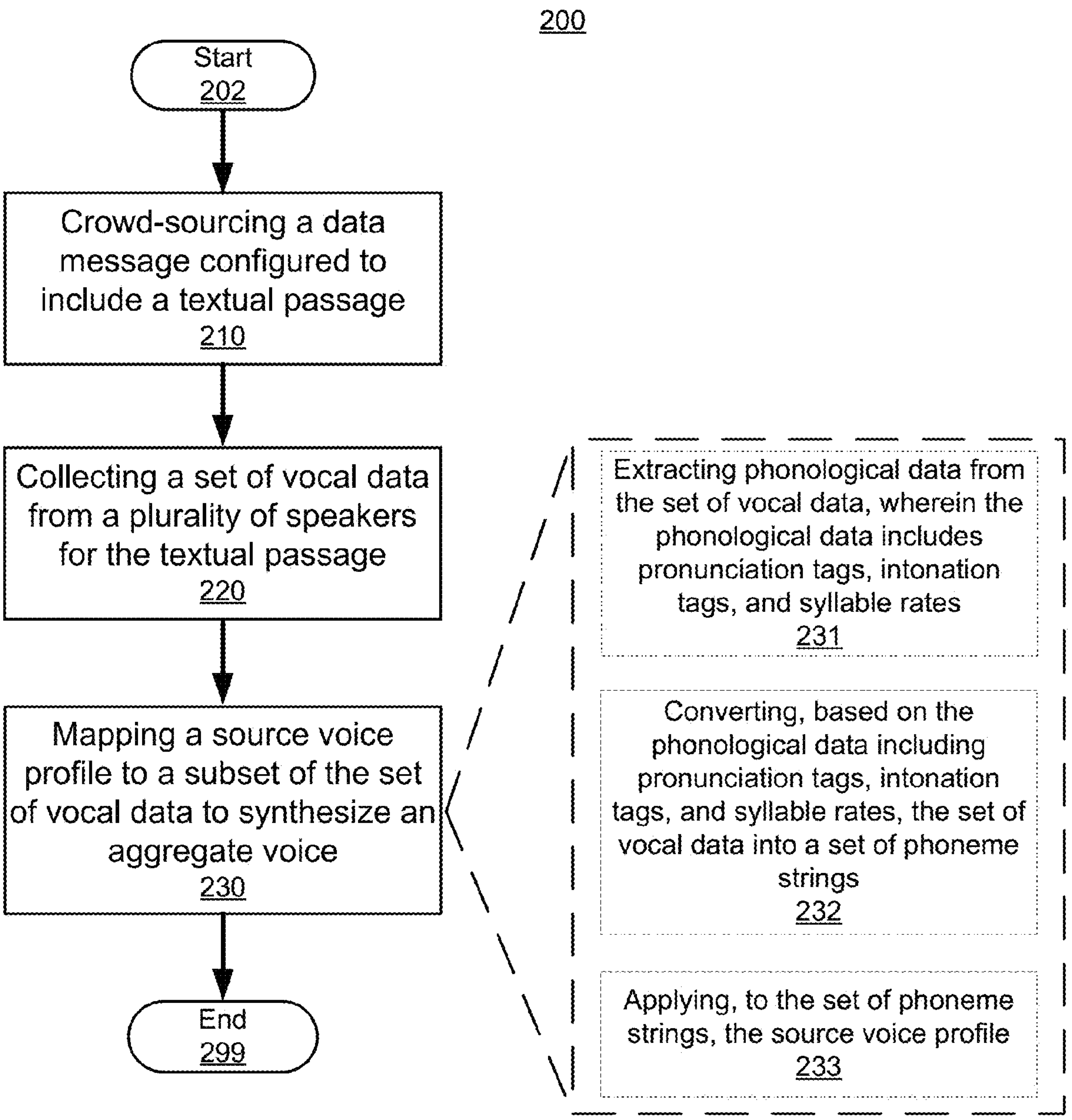
FIG. 2 is a flowchart illustrating a method 200 for synthesizing an aggregate voice, according to embodiments.

FIG. 2 is a flowchart illustrating a method 200 for synthesizing an aggregate voice, consistent with embodiments of the present disclosure. Aspects of FIG. 2 are directed toward using a set of collected vocal-data for a crowd-sourced textual passage and a source voice profile to synthesize an aggregate voice. The method 200 may begin at block 202. Consistent with various embodiments, the method can include a crowd-sourcing block 210, a collecting block 220, a mapping block 230, an extracting block 231, a converting block 232, and an applying block 233. The method may end at block 299.

Consistent with various embodiments, at block 210 the method 200 can include crowd-sourcing a data message configured to include a textual passage. Crowd-sourcing may generally refer to soliciting the participation or contributions of a community of users to obtain desired services, ideas, or content. Put differently, crowd-sourcing may include the process of obtaining services, ideas, or content by soliciting contribution of a group of people. In certain embodiments, the group of people may be an online community. In certain embodiments, the group of people may include traditional employees or suppliers. Crowd-sourcing may be implemented in one of a number of ways (wisdom of the crowd, crowd-searching, crowd-voting, crowd-funding, microwork, creative crowdsourcing, inducement prize contests, etc.) depending on the goal or purpose of the project. Aspects of the present disclosure, in certain embodiments, are directed toward crowd-sourcing a data message configured to include a textual passage. The data message may be information generated, sent, received or stored by electronic, magnetic, optical or similar means, including electronic data interchange, electronic mail, telegram, telex, or telecopy. The textual passage may be a portion of a book, literary composition, news article, email, text message, doctoral thesis, or other written media including textual content.

Crowd-sourcing the data message configured to include the textual passage can include transmitting the data message to one or more users. In certain embodiments, the textual passage may be transmitted directly to a selected community of users. As an example, the textual passage may be sent via email to a group of users who have indicated willingness to participate. In certain embodiments, the textual passage may be hosted on a crowd-sourcing platform (e.g., a website or internet page) accessible to a large-scale community of users. More particularly, the data message may be transmitted to a crowd-sourcing node such as a web server or other computing device. The crowd-sourcing node may be connected to a communication network (e.g., the internet) through which it can be made accessible to a large-scale population of users. As an example, users could access the textual passage by visiting a web page via a web browser. In certain embodiments, the data message may be transmitted to users through a software program such as a mobile app. Other methods of crowd-sourcing the data message configured to include the textual passage are also possible.

Consistent with various embodiments, at block 220 the method 200 can include collecting a set of vocal data from a plurality of speakers for the textual passage. The set of vocal data may include a recording of spoken words or phrases by one or more individuals. Aspects of the present disclosure, in certain embodiments, are directed toward collecting vocal data including spoken recordings for the textual passage. In certain embodiments, collecting the vocal data may include prompting a user to speak into a microphone or other form of sound-capture device. For example, the textual passage may be displayed on the screen of a computer, tablet, smartphone, or other device. The user may be prompted to begin reading the textual passage aloud, and the device may begin recording the voice of the user. In certain embodiments, the vocal data may be a spoken recording of a portion of the textual passage. Vocal data for different portions of the textual passage may be collected from different users. Vocal data corresponding to the same portion of the textual passage may also be collected. Consider the following example. In certain embodiments, the textual passage may be a novel having 10 chapters. Vocal data may be collected for a first speaker reading the entirety of the novel (e.g., chapters 1-10) aloud, a second speaker reading chapters 2 and 7, a third speaker reading chapters 4 and 5, and a fourth, fifth, and sixth speaker reading chapter 1. Other recording configurations and methods of collecting the vocal data for the textual passage are also possible.

In certain embodiments, the method 200 may include providing feedback to the speaker regarding the vocal data. The method 200 may further include identifying portions of the vocal data that may need to be re-recorded. For example, a speaker may have unintentionally lowered his or her voice such that a particular portion of the vocal data is inconsistent with the rest of the vocal data. Accordingly, the method 200 may include replaying the collected vocal data to the speaker, and parking the portion that may need to be re-recorded. Further, in certain embodiments, the method 200 may include training the speaker to instruct them regarding the desired characteristics and attributes of vocal data. For example, the method 200 may include indicating to a speaker when his or her pronunciation was unclear, which words need more precise enunciation, and the like. Further, in certain embodiments, the method 200 may include using the collected vocal data and machine learning techniques to refine subsequent vocal data collection.

In certain embodiments, the method 200 may include using a natural language processing technique configured to parse a corpus of text, and select a subset of the corpus of text as the textual passage. In certain embodiments, selection of the subset of the corpus as the textual passage may be based on an evaluation of the prospective popularity of the textual passage. For example, the natural language processing technique may be configured to parse trending searches, social media, and other sources to determine a list of popular topics, characteristics, and themes, and use them to identify the subset of the corpus as the textual passage. In certain embodiments, the method 200 may include selecting a subset of the corpus as the textual passage based on a survey of existing reader coverage (e.g., vocal readings) of the corpus. As an example, in certain embodiments, a subset of the corpus that has less reader coverage could be selected as the textual passage instead of a subset of the corpus that has a larger degree of reader coverage. Additionally, in certain embodiments, a subset of the corpus may be selected as the textual passage based on user feedback. For example, feedback from users may indicate that the quality of the vocal data corresponding to a particular subset of the corpus could use improvement (e.g., poor audio quality). Accordingly, the subset of the corpus that could use improvement may be selected as the textual passage.

Consistent with various embodiments, at block 230 the method 200 may include mapping a source voice profile to a subset of the set of vocal data to synthesize the aggregate voice. The subset of the set of vocal data may be a portion of the set of vocal data. For example, the subset of the set of vocal data may, for instance, be an individual recording of a portion of a textual passage by a user. In certain embodiments, the subset of vocal data may be multiple recordings of a portion of a textual passage by a user. The source voice profile may include a predetermined set of phonological and prosodic characteristics corresponding to the voice of an individual. More particularly, the set of phonological and prosodic characteristics may be a collection of different speech characteristics such as rate, pitch, language, accent, rhythm, stress, tone, punctuation levels, intonation, and other speech attributes that are saved together. In certain embodiments, the source voice profile may correspond to the voice of a specific individual (e.g., celebrity, voice actor, family member, friend, or other individual). In certain embodiments, a collection of source voice profiles may be stored on a source voice profile database that is accessible to the method 200. Accordingly, the method 200 can be configured to access the source voice profile database, and select a specific source voice profile to map to the subset of the set of vocal data and synthesize the aggregate voice.

In certain embodiments, as shown in FIG. 2, the mapping block 230 can include an extracting block 231. At block 231, the method 200 may include extracting phonological data from the set of vocal data. The phonological data may include pronunciation tags, intonation tags, and syllable rates. Other types of vocal data are also possible. Generally, extracting the phonological data may include using a natural language processing technique configured to parse the set of vocal data and derive the phonological data. In certain embodiments, the natural language processing technique may be configured to derive the phonological data based on a phonology model of predetermined parameters. Consider the following example. In certain embodiments, the set of vocal data may be parsed, and the natural language processing algorithm may identify a recurring final-syllable stress on two-syllable words ending in the prefix "-ate," non-rhoticity in multiple words, and an average syllable rate of 6.19 syllables per second. Identification of other phonological data is also possible.

In certain embodiments, as shown in FIG. 2, the mapping block 230 can include a converting block 232. At block 232, the method 200 may include converting, based on the phonological data, the subset of vocal data into a set of phoneme strings. Generally, the phonemes can be contrastive linguistic units of sound that distinguish one word from another. For example, the difference in meaning between the English words "hat" and "bat" is a result of the exchange of the phoneme /h/ for the phoneme /b/. Similarly, the difference in meaning between the words "blip" and "bliss" is a result of the exchange of the phoneme /p/ for the phoneme /s/. In certain embodiments, the set of phoneme strings may be a collective group of individually separated phonemes. More particularly, the natural language processing technique may be configured to identify the phonemes of a particular phrase, and represent the phrase as a string of phonemes. As an example, the phrase "dream and beach" could be converted into the phoneme strings (/d/r/E/m/) (/a/n/d) (/b/E/ch/). Other methods of phoneme identification and conversion are also possible.

In certain embodiments, as shown in FIG. 2, the mapping block 230 can include an applying block 233. At block 233, the method 200 may include applying the source voice profile to the set of phoneme strings. Generally, applying the source voice profile to the set of phoneme strings can include relating the phonological and prosodic characteristics of the voice profile with the phoneme strings of the subset of vocal data. More specifically, in certain embodiments, the method 200 can include correlating the phoneme strings with the phonological and prosodic characteristics of the voice profile to generate a voice component. The voice component may be an audio speech recording of the set of phoneme strings based on the phonological and prosodic characteristics of the source voice profile. As described herein, in certain embodiments, the voice component may correspond to a set of phoneme strings of a subset of vocal data for a portion of a crowd-sourced textual passage. Aspects of the present disclosure, in certain embodiments, are directed toward generating a voice component for multiple subsets of the set of vocal data. Put differently, the method 200 can include generating a voice component for multiple portions of the textual passage. For example, a first voice component may correspond to the first two chapters of a five-chapter book, a second voice component may correspond to the second two chapters of the book, and a third voice component may correspond to the last chapter of the book. Accordingly, in certain embodiments, the first, second, and third voice components may be linked together to synthesize an aggregate voice for the book based on the phonological and prosodic characteristics of the source voice profile. As described herein, the aggregate voice may include an audio reading for the book in a single consistent voice.

Aspects of the present disclosure, in certain embodiments, relate to the recognition that vocal data for the same portion of the textual passage may be collected from multiple users with varying speech characteristics (e.g., phonological data). For example, in certain embodiments, a first subset of vocal data for a particular chapter of a book may be collected from a native English speaker with a British accent, and a second subset of vocal data for the same chapter of the book may be collected from a native Japanese speaker who learned English as a second language. Accordingly, aspects of the present disclosure, in certain embodiments, are directed toward determining a particular subset of vocal data to receive the mapping of the source voice profile. In certain embodiments, determining the particular subset of the vocal data may be based upon a comparison between the speech characteristics (e.g., phonological data) of the voice profile and the set of vocal data. As an example, a particular voice profile having similar speech characteristics (e.g., similar rhythm, tone, intonation, syllable rate, accent, pronunciation, etc.) to the subset of vocal data may be selected. For instance, for a subset of vocal data with identified characteristics including recurring final-syllable stress on two-syllable words ending in the prefix "-ate," non-rhoticity in multiple words, and an average syllable rate of 6.19 syllables per second, a voice profile having similar characteristics may be selected to map to the subset of vocal data.

In certain embodiments, the method 200 may be configured to combine multiple subsets of vocal data. In particular, multiple subsets of vocal data corresponding to the same portion of a textual passage may be combined. As described herein, each subset of the vocal data may be converted into a set of phoneme strings. The method 200 may include aligning each phoneme of each set of phoneme strings with the phonemes of another set of phoneme strings. The method 200 may then include using the phonological data for each respective set of phoneme strings to integrate the subsets of the vocal data. Accordingly, as described herein, the method 200 may then include mapping the voice profile to the integrated subsets of vocal data.

Figure 3:
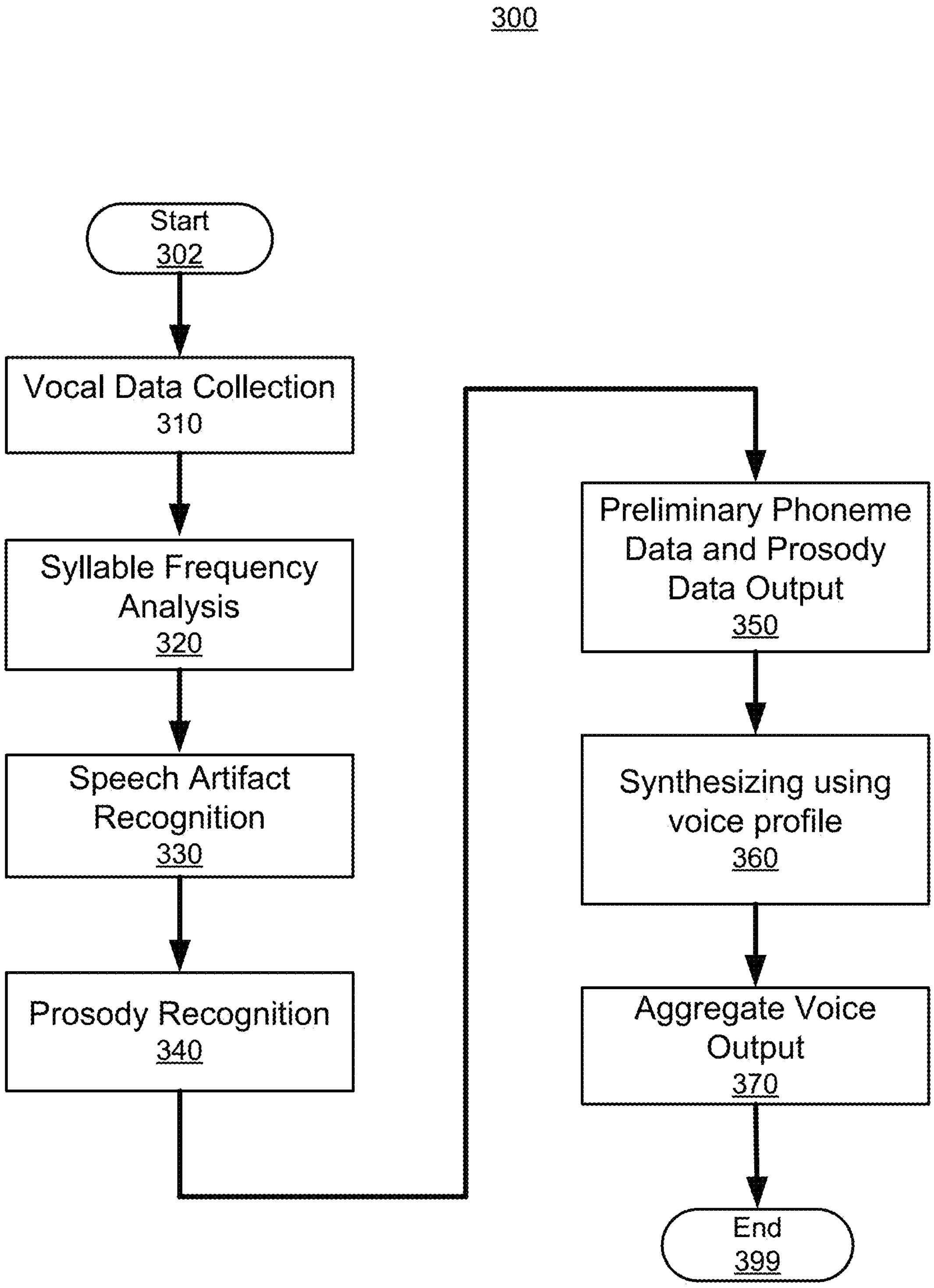
FIG. 3 is a flowchart illustrating a method 300 for synthesizing an aggregate voice, according to embodiments.

FIG. 3 is a flowchart illustrating a method 300 for synthesizing an aggregate voice, consistent with embodiments of the present disclosure. In certain embodiments, the method 300 may start at block 302 and end at block 399. As shown in FIG. 3, the method 300 may include a vocal data collection block 300, a syllable frequency analysis block 320, a speech artifact recognition system 330, a prosody recognition block 340, a preliminary phoneme data and prosody data output block 350, a synthesis block 360, and an aggregate voice output block 370. Aspects of FIG. 3, in certain embodiments, are directed toward using identified phonological characteristics and a voice profile to synthesize an aggregate voice.

Consistent with various embodiments, at block 310 the method 300 can include collecting vocal data. In certain embodiments, block 310 of the method 300 may substantially correspond with block 210 of the method 200. As described herein, collecting vocal data can include gathering voice recordings from a plurality of speakers for a crowd-sourced textual passage. The set of vocal data may include a recording of spoken words or phrases by one or more individuals. Aspects of the present disclosure, in certain embodiments, are directed toward collecting vocal data including spoken recordings for the textual passage. In certain embodiments, collecting the vocal data may include prompting a user to speak into a microphone or other form of sound-capture device.

Consistent with various embodiments, at block 320 the method 300 may include performing a syllable frequency analysis of the collected set of vocal data. The syllable frequency analysis may include parsing the set of vocal data to determine a rate of speech. For example, in certain embodiments, the number of syllables spoken during a given time frame may be counted to obtain the number of syllables spoken with respect to time. As an example, in certain embodiments, the syllable rate may be determined to be 6.18 syllables per second. In certain embodiments, the syllable rate may be determined to be 7.82 syllables per second. Other methods of performing the syllable frequency analysis are also possible.

Consistent with various embodiments, at block 330 the method 300 can include performing speech artifact recognition for the set of vocal data. In certain embodiments, the speech artifact recognition can include using a natural language processing technique to identify sub-phoneme speech artifacts of the set of vocal data. The sub-phoneme speech artifacts may correspond to symbols in a speech-recognition codebook. In certain embodiments, a hidden Markov model may be used to correlate the sub-phoneme speech artifacts to high-level speech artifacts. For example, the high-level speech artifacts may include syllables, demi-syllables, triphones, phonemes, words, sentences, and the like. Further, in certain embodiments, the symbols in the speech-recognition codebook may include vectors that represent various features of the symbols. For instance, the vectors may represent the intensity of the signal (e.g., of the set of vocal data) at different frequencies (e.g., pitches). In certain embodiments, the vectors may be extracted based through a machine learning process using voice samples.

Consistent with various embodiments, at block 340 the method 300 can include performing prosody recognition for the set of vocal data. In certain embodiments, prosody recognition can include measuring the time duration of the sub-phoneme speech artifacts, high-level speech artifacts, and pitch features of the set of vocal data. In certain embodiments, the sub-phoneme speech artifacts, high-level speech artifacts, and pitch features of the vocal data may also correspond to sets of symbols in the speech-recognition codebook that indicate the prosodic characteristics of the vocal data. Similarly, the hidden Markov model may also be used to correlate the symbols in the speech-recognition codebook with pre-determined prosodic characteristics. Additionally, in certain embodiments, prosody recognition may include recognizing word boundaries.

Consistent with various embodiments, at block 350 the method 300 can include outputting the preliminary phoneme data and prosody data. In certain embodiments, the preliminary phoneme data and prosody data (e.g., the information identified in the speech artifact recognition block 330 and the prosody recognition block 340) may be output to a voice synthesis system. Aspects of the present disclosure, in certain embodiments, are directed toward outputting phoneme data and prosody data for multiple users to the voice synthesis system. As described herein, the phoneme data and prosody data may correspond to a set of vocal data for a portion of a crowd-sourced textual passage.

Consistent with various embodiments, at block 360 the method 300 can include synthesizing the set of vocal data using a source voice profile. In certain embodiments, the synthesis block 360 of the method 300 may substantially correspond with the mapping block 230 of the method 200. Synthesizing the set of vocal data using may include using the collected phoneme data and prosody data to match the phonemes of a set of vocal data with the phonemes of another set of vocal data. Accordingly, as described herein, the method 300 may also include applying a source voice profile with predetermined voice characteristics to generate an aggregate voice. As shown in FIG. 3, consistent with various embodiments, at block 370 the aggregate voice may be output. In certain embodiments, outputting the aggregate voice may include transmitting it to a server, computer, network node, or remote device.

Figure 4:
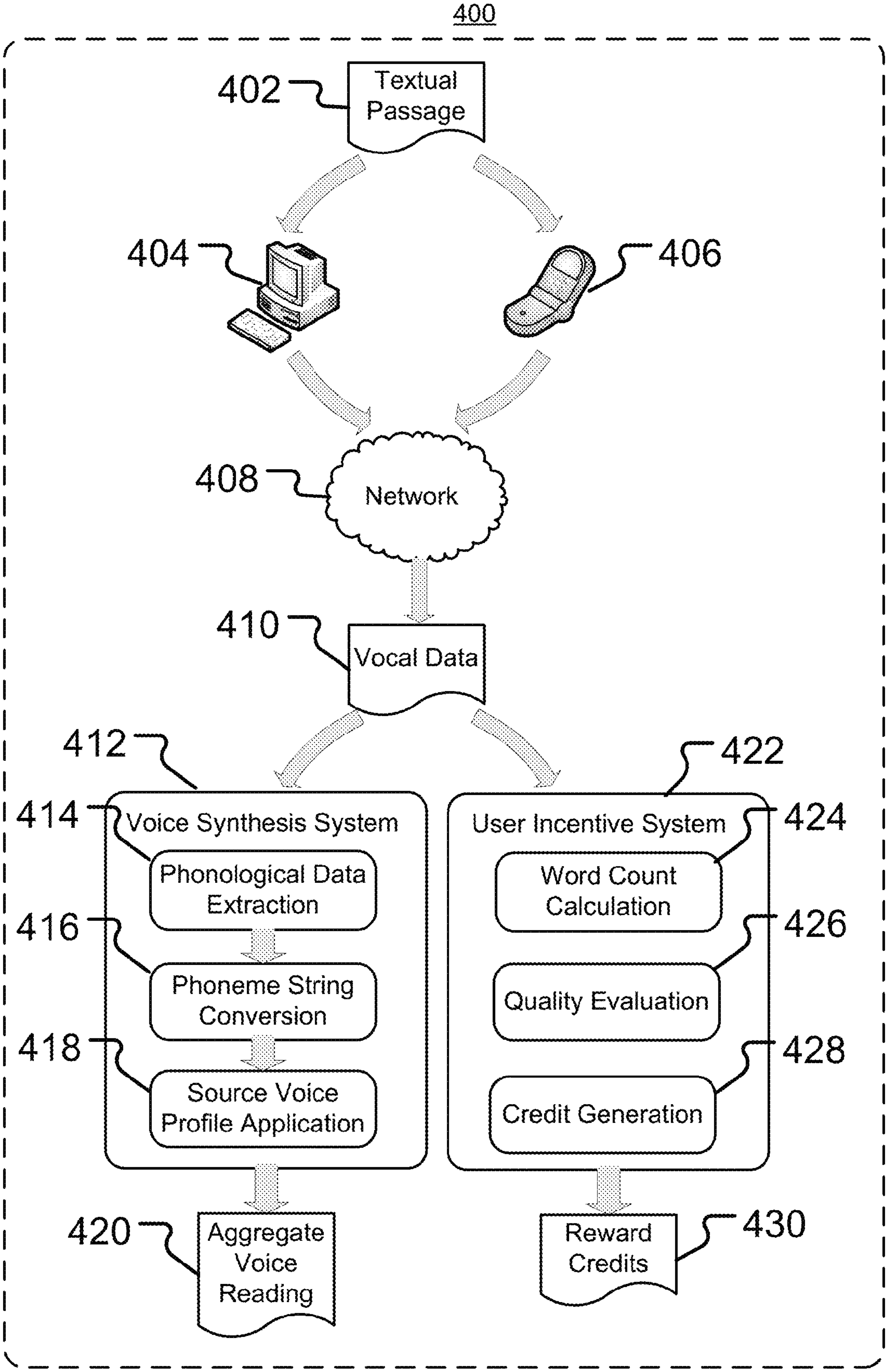
FIG. 4 is an example system architecture 400 for generating an aggregate voice, according to embodiments.

FIG. 4 is an example system architecture 400 for generating an aggregate voice, consistent with embodiments of the present disclosure. As shown in FIG. 4, the system architecture 400 can include a textual passage 402, remote devices 404, 406, a network 408, vocal data 410, a voice synthesis system 412, a phonological data extraction module 414, a phoneme string conversion module 416, a source voice profile application module 418, a user incentive system 422, a word count calculation module 424, a quality evaluation module 426, a credit generation module 428, and reward credits 430. Aspects of FIG. 4 are directed toward a system of modules for generating an aggregate voice and incentivizing a user, consistent with various embodiments.

As described herein, the system architecture 400 may include one or more remote devices 404, 406 configured to receive a textual passage. The textual passage may be a portion of a book, literary composition, news article, email, text message, doctoral thesis, or other written media including textual content. The remote devices 404, 406 may include desktop computers, laptop computers, smart phones, cellular phones, televisions, tablets, smart watches, or other computing devices. In certain embodiments, the remote devices 404, 406, the voice synthesis system 412, and the user incentive system 422 may be connected by a network 408. In certain embodiments, the remote devices 404, 406 may be configured to receive and display the textual passage. For example, the remote devices 404, 406 may display the textual passage on a screen via a user interface. As described herein, in certain embodiments, the remote devices 404, 406 may be equipped with microphones and other audio recording hardware configured to collect vocal data 410. The vocal data 410 may be voice recordings of users reading the textual passage 402 aloud. The remote devices 404, 406 may be configured to transmit the vocal data to the voice synthesis system 412 and the user incentive system 422 via the network 408.

As shown in FIG. 4, the system architecture 400 may include a voice synthesis system. As described herein, the voice synthesis system 412 may include a phonological data extraction module 414 configured to use a natural language processing algorithm to parse the vocal data 410 and extract phonological data including pronunciation data, intonation data, and syllable rates. The phoneme string conversion module 416 may be configured to use the phonological data to convert the vocal data 410 into a set of phoneme strings. The source voice application profile 418 may be configured to apply a source voice profile with predetermined voice characteristics to the set of phoneme strings in order to generate an aggregate voice reading 420 for the textual passage 402.

Consistent with various embodiments, the system architecture 400 may include a user incentive system 422. Generally, the user incentive system 422 may be configured to encourage individuals to provide vocal data for a textual passage. As shown in FIG. 4, the user incentive system 422 may include a word count calculation module 424. The word count calculation module 424 may be configured to parse the vocal data and determine a number of spoken words for the vocal data. For example, the word count calculation module 424 may determine that there are 874 words in a portion of the vocal data. The user incentive system 422 may also include a quality evaluation module 426. The quality evaluation module may be configured to evaluate phonological data associated with the set of vocal data and assign a quality score to the set of vocal data. The quality score may be an integer value between 1 and 100 that indicates a relative measure of the usefulness and value of the vocal data for the purpose of generating an aggregate voice. In certain embodiments, relatively high numbers may indicate a higher quality, while relatively low numbers may indicate a lower quality of the vocal data. As an example, a set of vocal data with clear, enunciated words, spoken at a moderate pace and a relaxed tone may be assigned a quality score of 87, while a mumbled voice spoken very quickly with background noise that obscures the words may be assigned a quality score of 23.

Aspects of the present disclosure, in certain embodiments, are directed toward using the credit generation module 428 to reward credits 430 for a speaker based on the quality score and word count associated with a particular set of vocal data. Generally, the reward credits 430 may be data representations of currency transferrable between individuals, companies, organizations, or the like. The reward credits 430 can be data representations of tokens, money, points, vouchers, coupons, crypto currency, or other form of currency that can be exchanged for goods or services. In certain embodiments, the reward credits may be generated based on the quality score and word count of a particular set of vocal data. In certain embodiments, vocal data associated with a word count greater than a predetermined word quantity and a quality score above a quality threshold may be assigned bonus credits (e.g., additional reward credits).

In certain embodiments, the reward credits may be generated based on the degree of use (e.g., popularity) of the aggregate voice. More specifically, speakers who participated in the creation of an aggregate voice listened to by a substantially large group of people may be rewarded more reward credits than speakers who participated in the creation of an aggregate voice that was listened to by a substantially small number of people. In certain embodiments, the listeners to an aggregate voice may be allowed to submit feedback evaluating the quality of the aggregate voice (e.g., rate the understandability of the voice). Accordingly, speakers who participated in the creation of an aggregate voice that was evaluated more highly by listeners may receive more reward credits.

In certain embodiments, aspects of the present disclosure are directed toward crowd sourcing the textual passage 402 and generating reward credits 430 in conjunction with entertainment content. For example, content in a computer game or smart phone application may be made available to users in exchange for receiving vocal data 410 corresponding to a textual passage 402. More specifically, in certain embodiments, the user incentive system 422 may be configured to detect a transition phase of an entertainment content sequence. As an example, the transition phase may be a commercial between songs in a music application, a transition between levels in a computer or smartphone game, or the like. During the transition phase, the user incentive system 422 may be configured to present a speech sample collection module configured to record enunciation data (e.g., vocal data 410) for the textual passage 402. Accordingly, in response to recording the vocal data 410, the user incentive system may be configured to advance the entertainment content sequence (e.g., proceed to the next song, level, etc.) Other methods of encouraging users to provide vocal data 410 for the textual passage 402 are also possible.

Figure 5:
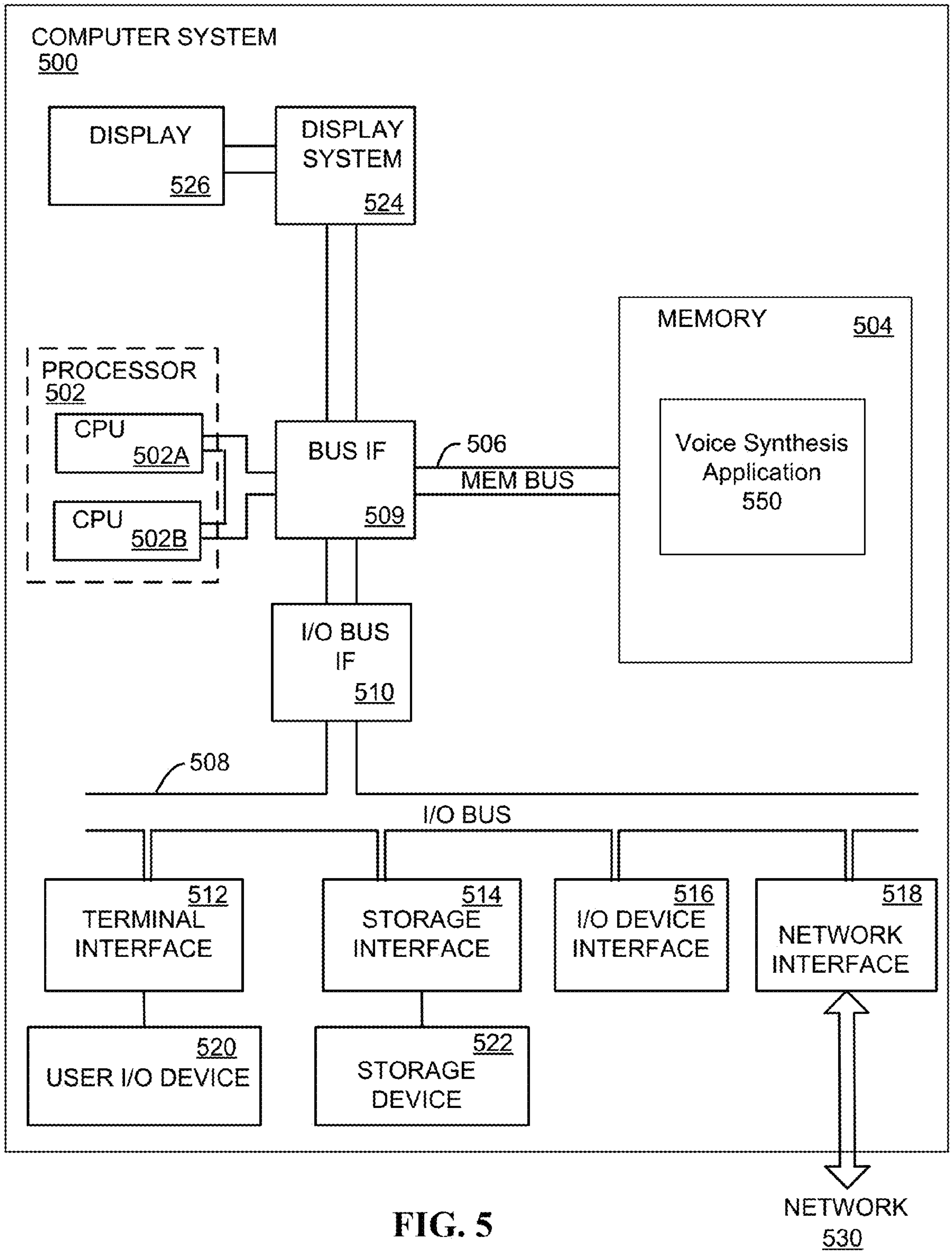
FIG. 5 depicts a high-level block diagram of a computer system 500 for implementing various embodiments, according to embodiments.

FIG. 5 depicts a high-level block diagram of a computer system 500 for implementing various embodiments. The mechanisms and apparatus of the various embodiments disclosed herein apply equally to any appropriate computing system. The major components of the computer system 500 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions stored in the memory 504 and may include one or more levels of on-board cache.

In embodiments, the memory 504 may include a random-access semiconductor memory, storage device, or storage medium (either volatile or non-volatile) for storing or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store a voice synthesis application 550. In embodiments, voice synthesis application 550 may include instructions or statements that execute on the processor 502 or instructions or statements that are interpreted by instructions or statements that execute on the processor 502 to carry out the functions as further described below. In certain embodiments, the voice synthesis application 550 is implemented in hardware via semiconductor devices, chips, logical gates, circuits, circuit cards, and/or other physical hardware devices in lieu of, or in addition to, a processor-based system. In embodiments, the voice synthesis application 550 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 5 depicts several major components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for synthesizing multi-person speech into an aggregate voice, the method comprising:

crowd-sourcing a data message configured to include a textual passage;

collecting, from a plurality of speakers, a set of vocal data for the textual passage, wherein the set of vocal data includes a first set of enunciation data corresponding to a first portion of the textual passage, a second set of enunciation data corresponding to a second portion of the textual passage, and a third set of enunciation data corresponding to both the first and second portions of the textual passage;

mapping a source voice profile to a subset of the set of vocal data to synthesize the aggregate voice; wherein mapping the source voice profile includes:

extracting phonological data from the set of vocal data, wherein the phonological data includes pronunciation tags, intonation tags, and syllable rates;

converting, based on the phonological data including pronunciation tags, intonation tags and syllable rates, the set of vocal data into a set of phoneme strings; and applying, to the set of phoneme strings, the source voice profile;

assigning, based on evaluating the phonological data from the set of vocal data, a first quality score to the first set of enunciation data; and transmitting, in response to determining that the first quality score is greater than a first quality threshold, bonus credits to a first speaker of the first set of enunciation data.

2. The method of claim 1, wherein the source voice profile includes a predetermined set of phonological and prosodic characteristics corresponding to a voice of a first individual.

3. The method of claim 2, wherein the phonological and prosodic characteristics include rhythm, stress, tone, and intonation.

4. The method of claim 1, further comprising:

detecting, by an incentive system, a transition phase of an entertainment content sequence;

presenting, during the transition phase of the entertainment content sequence, a speech sample collection module configured to record enunciation data for the textual passage; and advancing, in response to recording enunciation data for the textual passage, the entertainment content sequence.

5. The method of claim 1, wherein transmitting bonus credits is in further response to determining the first set of enunciation data has a usage above a usage threshold.

6. The method of claim 1, wherein collecting a set of vocal data further comprises:

prompting a respective speaker of the plurality of speakers to read the first portion of the textual passage; and recording the respective speaker reading the first portion of the textual passage.

7. The method of claim 6, wherein collecting a set of vocal data further comprises:

determining, based on the first set of enunciation data, that the first portion of the textual passage needs to be recorded again; and indicating to the respective user that the first portion of the textual passage needs to be recorded again.

8. A system for synthesizing multi-person speech into an aggregate voice, the system comprising:

a crowd-sourcing module configured to crowd-source a data message including a textual passage;

a collecting module configured to collect, from a plurality of speakers, a set of vocal data for the textual passage, wherein the set of vocal data includes a first set of enunciation data corresponding to a first portion of the textual passage, a second set of enunciation data corresponding to a second portion of the textual passage, and a third set of enunciation data corresponding to both the first and second portions of the textual passage;

a mapping module configured to map a source voice profile to a subset of the set of vocal data to synthesize the aggregate voice, wherein mapping the source voice profile to a subset of the set of vocal data to synthesize the aggregate voice includes:

an extracting module configured to extract phonological data from the set of vocal data, wherein the phonological data includes pronunciation tags, intonation tags, and syllable rates;

a converting module configured to convert, based on the phonological data including pronunciation tags, intonation tags and syllable rates, the set of vocal data into a set of phoneme strings; and an applying module configured to apply, to the set of phoneme strings, the source voice profile;

an assigning module configured to assign, based on evaluating the phonological data from the set of vocal data, a first quality score to the first set of enunciation data; and a transmitting module configured to transmit, in response to determining that the first quality score is greater than a first quality threshold, bonus credits to a first speaker of the first set of enunciation data.

9. The system of claim 8, wherein the source voice profile includes a predetermined set of phonological and prosodic characteristics corresponding to a voice of a first individual.

10. The system of claim 9, wherein the phonological and prosodic characteristics include rhythm, stress, tone, and intonation.

11. The system of claim 8, further comprising:

a detecting module configured to detect, using an incentive system, a transition phase of an entertainment content sequence;

a presenting module configured to present, during the transition phase of the entertainment content sequence, a speech sample collection module configured to record enunciation data for the textual passage; and an advancing module configured to advance, in response to recording enunciation data for the textual passage, the entertainment content sequence.

12. A computer program product comprising a computer readable storage medium having a computer readable program stored therein, wherein the computer readable storage medium does not comprise a transitory signal per se, wherein the computer readable program, when executed on a first computing device, causes the first computing device to:

crowd-source a data message configured to include a textual passage;

collect, from a plurality of speakers, a set of vocal data for the textual passage, wherein the set of vocal data includes a first set of enunciation data corresponding to a first portion of the textual passage, a second set of enunciation data corresponding to a second portion of the textual passage, and a third set of enunciation data corresponding to both the first and second portions of the textual passage;

map a source voice profile to a subset of the set of vocal data to synthesize the aggregate voice;

extract phonological data from the set of vocal data, wherein the phonological data includes pronunciation tags, intonation tags, and syllable rates;

convert, based on the phonological data including pronunciation tags, intonation tags and syllable rates, the set of vocal data into a set of phoneme strings;

apply, to the set of phoneme strings, the source voice profile;

assign, based on evaluating the phonological data from the set of vocal data, a first quality score to the first set of enunciation data; and transmit, in response to determining that the first quality score is greater than a first quality threshold, bonus credits to a first speaker of the first set of enunciation data.

13. The computer program product of claim 12, wherein the source voice profile includes a predetermined set of phonological and prosodic characteristics corresponding to a voice of a first individual.

14. The computer program product of claim 13, wherein the phonological and prosodic characteristics include rhythm, stress, tone, and intonation.

15. The computer program product of claim 12, further comprising computer readable program code configured to:

detect, by an incentive system, a transition phase of an entertainment content sequence;

present, during the transition phase of the entertainment content sequence, a speech sample collection module configured to record enunciation data for the textual passage; and advance, in response to recording enunciation data for the textual passage, the entertainment content sequence.

* * * * *